United States Patent [19]
Yoshikawa et al.

[11] Patent Number: 5,657,147
[45] Date of Patent: Aug. 12, 1997

[54] OPTICAL SCANNER

[75] Inventors: Motonobu Yoshikawa, Osaka; Yoshiharu Yamamoto, Toyonaka; Kazutake Boku, Yao; Hironori Nakashima, Takarazuka; Akinori Yusa, Kadoma; Ken Morishima, Higashiosaka, all of Japan

[73] Assignee: Matsushita Electric Industrial Co., Ltd., Kadoma, Japan

[21] Appl. No.: 505,974

[22] Filed: Jul. 24, 1995

[30] Foreign Application Priority Data

Jul. 28, 1994 [JP] Japan .................................. 6-176847

[51] Int. Cl.⁶ .................................................. G02B 26/08
[52] U.S. Cl. .......................... 359/208; 359/205; 359/207; 347/258
[58] Field of Search .................................. 359/205–208, 359/196, 215–219; 250/235, 236; 347/256, 258, 259

[56] References Cited

U.S. PATENT DOCUMENTS

| 5,408,095 | 4/1995 | Atsuumi et al. ........................ 250/236 |
| 5,426,298 | 6/1995 | Sakoma et al. ......................... 250/235 |
| 5,543,955 | 8/1996 | Yamazaki et al. ...................... 359/204 |

FOREIGN PATENT DOCUMENTS

| 62-127819 | 6/1987 | Japan ................................. 359/208 |
| 1-300217 | 12/1989 | Japan . |
| 1-300218 | 12/1989 | Japan . |

Primary Examiner—Paul M. Dzierzynski
Assistant Examiner—Darren E. Schuberg
Attorney, Agent, or Firm—Renner, Otto, Boisselle & Sklar

[57] ABSTRACT

The optical scanner of this invention includes a light source, an optical deflector for scanning a light flux from the light source, a first image formation optical system disposed between the light source and the optical deflector, and a second image formation optical system disposed between the optical deflector and a surface to be scanned. The second image formation optical system includes a curved mirror for reflecting a light flux from the optical deflector and a correction lens for converging the light flux from the curved mirror on the surface to be scanned. A refractive power in the sub-scanning direction at the center of the correction lens in the scanning direction is different from that at the periphery thereof.

27 Claims, 5 Drawing Sheets

OPTICAL SCANNER

BACKGROUND OF THE INVENTION

1. Field of the Invention

The present invention relates to an optical scanner used for laser beam printers, laser facsimiles, digital copying machines, and the like.

2. Description of the Related Art

Many types of optical scanner used for laser beam printers and the like include a semiconductor laser as a light source, a first image formation optical system for converging a light flux from the light source onto an optical deflector linearly for correcting a tilt of a deflection surface of the light deflector, a polygon mirror as the optical deflector, and a second image formation optical system for forming Uniform spots on a surface to be scanned at a constant velocity.

The second image formation optical system is conventionally composed of a plurality of large-size glass lenses called a fθ lens. The fθ lens is disadvantageous in that it is expensive and the size reduction thereof is difficult. In order to overcome these problems and realize a small-size, inexpensive optical scanner; there have been proposed, for example, optical scanners which use a cylindrical mirror and a cylindrical lens (Japanese Laid-Open Patent Publication No. 1300218), a spherical mirror and a cylindrical lens (Japanese Laid-Open Patent Publication No. 1-300217), and an aspherical mirror and a long cylinder optical element (e.g., a long toric lens) (U.S. Pat. No. 5,408,095) for the second image formation optical system.

However, in any of the above proposed optical systems, the correction of the curvature of field and the fθ correction are not sufficient and thus it is difficult to obtain an optical scanner with high resolution.

SUMMARY OF THE INVENTION

The optical scanner of this invention includes a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens.

In one embodiment of the invention, an incident surface of the correction lens is a saddle toroidal surface where a circular arc which is present in a plane parallel to the scanning direction and including an optical axis is rotated around a rotational symmetric axis which is parallel to the scanning direction and present in the plane including the optical axis.

In another embodiment of the invention, an incident surface of the correction lens is a saddle toroidal surface where a curve having fourth or higher order development terms which is present in a plane parallel to the scanning direction and including an optical axis is rotated around a rotational symmetric axis which is parallel to the scanning direction and is present in the plane including the optical axis.

In still another embodiment of the invention, an emergent surface of the correction lens is a cylindrical surface having a refractive power only in the scanning direction.

In still another embodiment of the invention, an emergent surface of the correction lens is a aspherical cylindrical surface which has a refractive power only in the scanning direction and the section of the surface in the scanning direction has fourth or higher order development terms.

In still another embodiment of the invention, an emergent surface of the correction lens is a barrel toroidal surface where a curve having fourth or higher order development terms which is present in a plane parallel to the scanning direction and including an optical axis is rotated around a rotational symmetric axis which is parallel to the scanning direction and is present in the plane including the optical axis.

In still another embodiment of the invention, when a focal length of the second image formation optical system in the scanning direction is $f_m$ (mm), an effective scanning width of the surface to be scanned is W (mm), a distance between a deflection point of the optical deflector and a reflection point of the curved mirror is L (mm), and a distance between an effective outermost position of the curved mirror in the scanning direction and a tangent plane of a vertex of the mirror surface is zm (mm), conditional formula (1) below is satisfied:

$$0.159 \left( \frac{L}{f_m} + C_1 \right)^2 + C_2 - 0.267 < \frac{zm}{f_m} < 0.159 \left( \frac{L}{f_m} + C_1 \right)^2 + C_2 - 0.257 \quad (1)$$

wherein $$C_1 = 0.388 \left( \frac{W}{f_m} \right)^2 - 0.416 \frac{W}{f_m} \, 0.217$$

$$C_2 = -0.153 \left( \frac{W}{f_m} \right)^2 + 0.404 \frac{W}{f_m}$$

In still another embodiment of the invention, the curved mirror has an axial-symmetric aspherical surface.

In still another embodiment of the invention, when a displacement of a vertex of the curved mirror from an optical axis is $x_m$ (mm), conditional formula (2) below is satisfied:

$$0.5 < x_m < 5.0 \quad (2)$$

In still another embodiment of the invention, when a distance between a reflection point of the optical deflector and a reflection point of the curved mirror is L (mm), a distance between the reflection point of the curved mirror and an incident surface of the correction lens is M (mm), and the focal length of the second image formation optical system in the scanning direction is $f_m$ (mm), conditional formula (3) below is satisfied:

$$0.43 \left( 1 - \frac{L}{f_m} \right) < \frac{M}{f_m} < 0.75 \quad (3)$$

In still another embodiment of the invention, an angle formed by a plane vertical to a reflection surface of the optical deflector and parallel to the scanning direction and an optical axis of the first image formation optical system is $\beta_p$ (deg.), a distance between a reflection point of the optical deflector and a reflection point of the curved mirror is L (mm), a distance between the reflection point of the curved mirror and the incident surface of the correction lens is M (mm), a focal length of the second image formation optical system in the scanning direction is $f_m$ (mm), and a displacement of a center of the incident surface of the correction lens from the optical axis an the sub-scanning direction is $x_L$ (mm), conditional formula (4) below is satisfied:

$$0.11 \frac{L}{f_m} - 0.043 \frac{M}{f_m} + \tag{4}$$

$$0.0007 < \frac{5 \cdot x_L}{f_m \cdot \beta_p} < 0.11 \frac{L}{f_m} - 0.043 \frac{M}{f_m} + 0.0155$$

In still another embodiment of the invention, an angle formed by a plane vertical to a reflection surface of the optical deflector and parallel to the scanning direction and an optical axis of the first image formation optical system is $\beta_p$ (deg.), a distance between a reflection point of the optical deflector and a reflection point of the curved mirror is L (mm), a distance between the reflection point of the curved mirror and an incident surface of the correction lens is M (mm), a focal length of the second image formation optical system in the scanning direction is $f_m$ (mm), and an angle formed by a normal to a vertex of the curved mirror and the optical axis is $\beta_m$ (deg.), conditional formula (5) below is satisfied:

$$\frac{0.31}{\frac{L}{f_m} - 0.162} - \frac{\left(\frac{M}{f_m} - 0.738\right)^2}{0.42\left(\frac{L}{f_m}\right)^2 + 0..00272} + 1.5 < \beta_m \cdot \tag{5}$$

$$\frac{5}{\beta_p} < \frac{0.31}{\frac{L}{f_m} - 0.162} - \frac{\left(\frac{M}{f_m} - 0.738\right)^2}{0.42\left(\frac{L}{f_m}\right)^2 + 0.00272} + 4.5$$

In still another embodiment of the invention, a focal length of the second image formation optical system in the scanning direction is $f_m$ (mm), and an effective scanning width of the surface to be scanned is W (mm), conditional formula (6) below is satisfied:

$$1.30 < \frac{W}{f_m} < 2.13 \tag{6}$$

In still another embodiment of the invention, an incident surface of the correction lens is a saddle toroidal surface where a curve having fourth or higher order development terms which is present in a plane parallel to the scanning direction and including an optical axis is rotated around a rotational symmetric axis which is parallel to the scanning direction and is present in the plane including the optical axis.

In still another embodiment of the invention, an emergent surface of the correction lens is a cylindrical surface having a refractive power only in the scanning direction.

In still another embodiment of the invention, an emergent surface of the correction lens is a aspherical cylindrical surface which has a refractive power only in the scanning direction and the section of the surface in the scanning direction has fourth or higher order development terms.

In still another embodiment of the invention, when a focal length of the second image formation optical system in the scanning direction is $f_m$ (mm), an effective scanning width of the surface to be scanned is W (mm), a distance between a deflection point of the optical deflector and a reflection point of the curved mirror is L (mm), and a distance between an effective outermost position of the curved mirror in the scanning direction and a tangent plane of a vertex of the mirror surface is zm (mm), conditional formula (1) below is satisfied:

$$0.159\left(\frac{L}{f_m} + C_1\right)^2 + \tag{1}$$

$$C_2 - 0.267 < \frac{zm}{f_m} < 0.159\left(\frac{L}{f_m} + C_1\right)^2 + C_2 - 0.257$$

wherein $$C_1 = 0.388 \left(\frac{W}{f_m}\right)^2 - 0.416 \frac{W}{f_m} \; 0.217$$

$$C_2 = -0.153 \left(\frac{W}{f_m}\right)^2 + 0.404 \frac{W}{f_m}$$

In still another embodiment of the invention, when a displacement of a vertex of the curved mirror from an optical axis is $x_m$ (mm), conditional formula (2) below is satisfied:

$$0.5 < x_m < 5.0 \tag{2}$$

In still another embodiment of the invention, when a distance between a reflection point of the optical deflector and a reflection point of the curved mirror is L (mm), a distance between the reflection point of the curved mirror and an incident surface of the correction lens is M (mm), and the focal length of the second image formation optical system in the scanning direction is $f_m$ (mm), conditional formula (3) below is satisfied:

$$0.43\left(1 - \frac{L}{f_m}\right) < \frac{M}{f_m} < 0.75 \tag{3}$$

In still another embodiment of the invention, an angle formed by a plane vertical to a reflection surface of the optical deflector and parallel to the scanning direction and an optical axis of the first image formation optical system is $\beta_p$ (deg.), a distance between a reflection point of the optical deflector and a reflection point of the curved mirror is L (mm), a distance between the reflection pointer the curved mirror and the incident surface of the correction lens is M (mm), a focal length of the second image formation optical system in the scanning direction is $f_m$ (mm), and a displacement of a center of the incident surface of the correction lens from the optical axis in the sub-scanning direction is $x_L$ (mm), conditional formula (4) below is satisfied:

$$0.11 \frac{L}{f_m} - 0.043 \frac{M}{f_m} + \tag{4}$$

$$0.0007 < \frac{5 \cdot x_L}{f_m \cdot \beta_p} < 0.11 \frac{L}{f_m} - 0.043 \frac{M}{f_m} + 0.0155$$

In still another embodiment of the invention, an angle formed by a plane vertical to a reflection surface of the optical deflector and parallel to the scanning direction and an optical axis of the first image formation optical system is $\beta_p$ (deg.), a distance between a reflection point of the optical deflector and a reflection point of the curved mirror is L (mm), a distance between the reflection point of the curved mirror and an incident surface of the correction lens is M (mm), a focal length of the second image formation optical system in the scanning direction is $f_m$ (mm), and an angle formed by a normal to a vertex of the curved mirror and the optical axis is $\beta_m$ (deg.), conditional formula (5) below is satisfied:

$$\frac{0.31}{\frac{L}{f_m} - 0.162} - \frac{\left(\frac{M}{f_m} - 0.738\right)^2}{0.42\left(\frac{L}{f_m}\right)^2 + 0..00272} + 1.5 < \beta_m. \quad (5)$$

$$\frac{5}{\beta_p} < \frac{0.31}{\frac{L}{f_m} - 0.162} - \frac{\left(\frac{M}{f_m} - 0.738\right)^2}{0.42\left(\frac{L}{f_m}\right)^2 + 0.00272} + 4.5$$

In still another embodiment of the invention, a focal length of the second image formation optical system in the scanning direction is $f_m$ (mm), and an effective scanning width of the surface to be scanned is W (mm), conditional formula (6) below is satisfied:

$$1.30 < \frac{W}{f_m} < 2.13 \quad (6)$$

Alternatively, an image formation apparatus using the optical scanner is provided.

Thus, the invention described herein makes possible the advantages of (1) providing an optical scanner where high resolution can be realized with a reduction in size and cost and (2) providing a small-size and inexpensive image formation apparatus with high resolution by use of the above optical scanner.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

Figure 1:
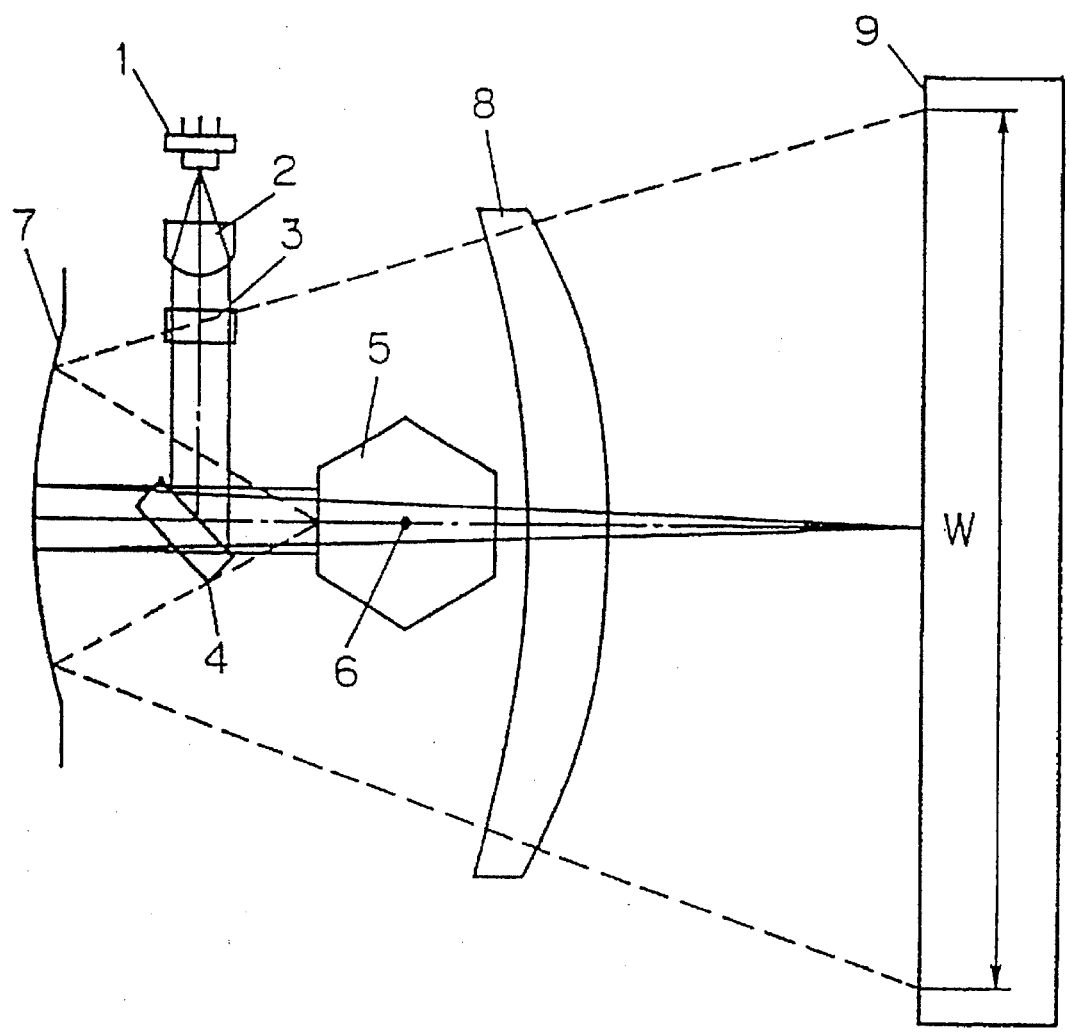
FIG. 1 shows a configuration of an optical scanner according to the present invention in a scanning plane.
Figure 2:
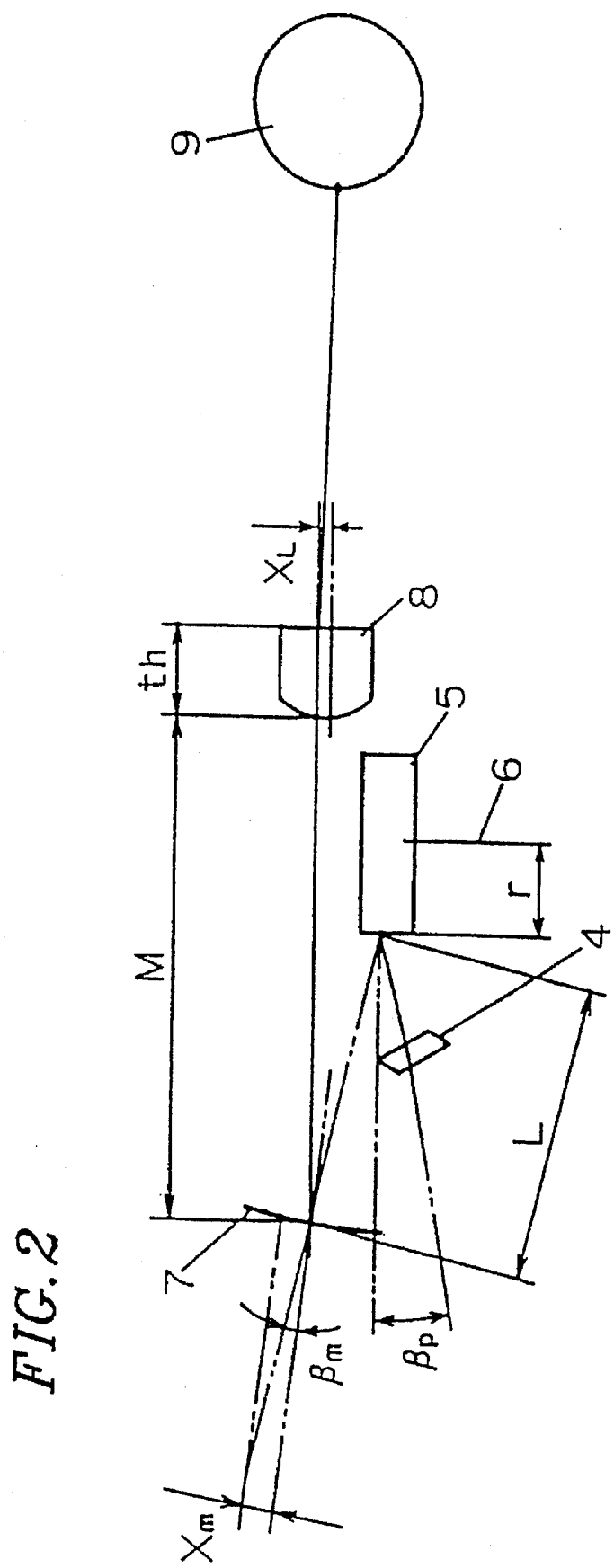
FIG. 2 is a sectional view of the optical scanner according to the present invention taken along a sub-scanning direction.

FIG. 1 shows a configuration of an optical scanner according to the present invention in a scanning plane. FIG. 2 is a sectional view of the optical scanner taken along a plane parallel to a sub-scanning direction including a scanning center axis. Referring to FIG. 1, the optical scanner of the present invention includes a semiconductor laser 1, a collimator lens 2, a cylindrical lens 3 having a refractive power only in the sub-scanning direction, a reflex mirror 4, a polygon mirror 5 having a rotation center axis 6, an axial-symmetric aspherical mirror 7, and a correction lens 8 with a saddle toroidal incident surface and an aspherical cylindrical emergent surface. The reference numeral 9 denotes a photosensitive drum, and W (mm) denotes an effective scanning width.

The operation of the scanning optics with the above configuration will be described with reference to FIGS. 1 and 2.

A light flux from the semiconductor laser 1 is made parallel by the collimator lens 2, and then converged in the sub-scanning direction by the cylindrical lens 3. The light is then reflexed by the reflex mirror 4 to be converged on a reflection surface of the polygon mirror 5 as a linear image. The light is scanned as the polygon mirror 5 rotates around the rotation center axis 6, and is converged on the photosensitive drum 9 via the aspherical mirror 7 and the correction lens 8 to form an image on the photosensitive drum 9. During the above process, the curvature of field in the scanning direction and the fθ characteristics are effectively corrected mainly by the aspherical mirror 7 and the emergent surface of the correction lens 8, while the curvature of field in the sub-scanning direction is effectively corrected by the incident surface of the correction lens 8.

The shape of the axial-symmetric aspherical mirror 7 is expressed by formula (7) below when z (mm) is the sag at a coordinate p (mm) with regard to the symmetric axis from the tangent plane of the vortex of the surface, i.e., the distance between the coordinate p and the tangent plane of the vertex of the plane, where the direction toward the photosensitive drum 9 is positive:

$$z = \frac{\frac{p^2}{Rm}}{1 + \sqrt{1 - (1 + Km)\left(\frac{p}{Rm}\right)^2}} + \quad (7)$$

$$Dm \cdot p^4 + Em \cdot p^5 + Fm \cdot p^8 + Gm \cdot p^{10}$$

wherein $R_m$ (mm) is the radius of curvature, $K_m$ is the conical constant, $D_m$, $E_m$, $F_m$, and $G_m$ are the higher-order constants.

The incident surface of the correction lens 8 is a saddle toroidal surface which is expressed by formula (8) below when z (mm) is the sag at a position of x (mm) in the sub-scanning direction and y (mm) in the scanning direction in a coordinate having the vertex of the surface as the origin from the tangent plane of the vertex where the direction toward the photosensitive drum 9 is positive:

$$z = f(y) + \frac{1}{2} \cdot \frac{1}{R_{1v}} \cdot \{x^2 + y^2 - f^2(y)\} \quad (8)$$

$$f(y) = \frac{\frac{y^2}{R_{1H}}}{1 + \sqrt{1 - (1 + K_1)\left(\frac{y}{R_{1H}}\right)^2}} + D_1 \cdot y^4 + E_1 \cdot y^5 + F_1 \cdot y^6 + G_1 \cdot y^{10}$$

wherein $R_{1K}$ (mm) is the radius of curvature in the scanning direction, $R_{1v}$ (mm) is the radius of curvature in the sub-scanning direction, $K_1$ is the conical constant relating to the scanning direction, and $D_1$, $E_1$, $F_1$, and $G_1$ are the higher-order constants relating to the scanning direction.

The emergent surface of the correction lens 8 is an aspherical cylindrical surface or a barrel toroidal surface which is expressed by formula (9) below when z (mm) is the sag at a position of x (mm) in the subscanning direction and y (mm) in the scanning direction in a coordinate having the vertex of the surface as the origin where the direction toward the photosensitive drum 9 is positive:

$$\left. \begin{array}{l} z = f(y) + \dfrac{1}{2} \cdot \dfrac{1}{R_{2V}} \cdot \{x^2 + y^2 - f^2(y)\} \\[2ex] f(y) = \dfrac{\dfrac{y^2}{R_{2H}}}{1 + \sqrt{1 - (1+K_2)\left(\dfrac{y}{R_{2H}}\right)^2}} + D_2 \cdot y^4 + E_2 \cdot y^6 + F_2 \cdot y^8 + G_2 \cdot y^{10} \end{array} \right\} \quad (9)$$

wherein $R_{2H}$ (mm) is the radius of curvature in the scanning direction, $R_{2V}$ (mm) is the radius of curvature in the sub-scanning direction, $K_2$ is the conical constant relating to the scanning direction, and $D_2$, $E_2$, $F_2$, and $G_2$ are the higher-order constants relating to the scanning direction.

The reference codes in FIG. 2 denote the following:

L (mm): distance between the deflection point of the polygon mirror 5 and the reflection point of the aspherical mirror 7;

M (mm): distance between the reflection point of the aspherical mirror 7 and the incident surface of the correction lens 8;

th (mm): center thickness of the correction lens 8;

r (mm): distance between the reflection surface of the polygon mirror 5 and the rotation center axis 6 thereof;

$x_m$ (mm): displacement of the vertex of the aspherical mirror 7 from the optical axis in the sub-scanning direction, i.e., distance between the normal to the vertex of the aspherical mirror 7 and the reflection point of the polygon mirror 5;

$x_L$ (mm): displacement of the center of the incident surface of the correction lens 8 from the optical axis in the sub-scanning direction, i.e., distance between the incident point of the optical axis to the correction lens 8 and the normal to the vertex of the incident surface of the correction lens 8;

$\beta_p$ (deg.): angle formed by the plane vertical to the reflection surface of the polygon mirror 5 and parallel to the scanning direction and the optical axis of the reflex mirror 4; and $\beta_m$ (deg.): angle formed by the normal to the vertex of the aspherical mirror 7 and the optical axis.

Next, examples of the parameters of the optical scanner of the present invention are shown in the following tables as Examples 1 to 22. In the tables, $f_m$ (mm) denotes the focal length of a second image formation optical system in the scanning direction, and n denotes the refractive index of the lens material for the correction lens 5 at the wavelength of 780 nm. In the following tables, the expression "z e+y" is equivalent to Z×10$^{+y}$. For example, "1.2e+02" is equivalent to 1.2×10$^2$, that is 120.

EXAMPLE 1

| W | 220 | L | 36.0 | M | 62.5 | r | 17.32 |
|---|---|---|---|---|---|---|---|
| $x_m$ | 1.0 | $x_L$ | 2.00 | $\beta_p$ | 4.2 | $\beta_m$ | 3.75 |
| $f_m$ | 135.471 | | | | | | |
| $R_m$ | 246.2630 | th | 10 | $R_{1H}$ | −500.110 | $R_{2H}$ | 1004.954 |
| $K_m$ | −1.59656e + 01 | n | 1.51922 | $R_{1V}$ | 19.769 | $R_{2V}$ | 133.475 |
| $D_m$ | −1.63932e − 07 | | | $K_1$ | 0.00000 | $K_2$ | 0.00000 |
| $E_m$ | 8.48113e − 11 | | | $D_1$ | 3.63763e − 08 | $D_2$ | −3.85296e − 07 |
| $F_m$ | −2.46270e − 14 | | | $E_1$ | −5.89551e − 12 | $E_2$ | 3.56933e − 11 |
| $G_m$ | 2.88553e − 18 | | | $F_1$ | −5.28400e − 16 | $F_2$ | −3.29169e − 15 |
| | | | | $G_1$ | 9.29471e − 21 | $G_2$ | 1.39801e − 19 |

EXAMPLE 2

| W | 220 | L | 36.0 | M | 62.5 | r | 17.32 |
|---|---|---|---|---|---|---|---|
| $x_m$ | 1.0 | $x_L$ | 2.60 | $\beta_p$ | 4.8 | $\beta_m$ | 3.75 |
| $f_m$ | 135.461 | | | | | | |
| $R_m$ | 245.538 | th | 6 | $R_{1H}$ | −420.802 | $R_{2H}$ | 1520.693 |
| $K_m$ | −2.03787e + 01 | n | 1.51922 | $R_{1V}$ | 22.492 | $R_{2V}$ | ∞ |
| $D_m$ | −1.50852e − 07 | | | $K_1$ | 0.00000 | $K_2$ | 0.00000 |
| $E_m$ | 9.86386e − 11 | | | $D_1$ | 1.01764e − 08 | $D_2$ | −4.37046e − 07 |
| $F_m$ | −3.99974e − 14 | | | $E_1$ | 2.01354e − 13 | $E_2$ | 4.26431e − 11 |
| $G_m$ | 7.61824e − 18 | | | $F_1$ | 8.58569e − 16 | $F_2$ | 2.92046e − 15 |
| | | | | $G_1$ | −1.18174e − 19 | $G_2$ | 3.09542e − 20 |

EXAMPLE 3

| | | | | | | | |
|---|---|---|---|---|---|---|---|
| W | 220 | L | 36.0 | M | 45.0 | r | 17.32 |
| $x_m$ | 1.5 | $x_L$ | 3.25 | $\beta_p$ | 5.0 | $\beta_m$ | 1.0 |
| $f_m$ | 135.666 | | | | | | |
| $R_m$ | 231.271 | th | 10 | $R_{1H}$ | −330.159 | $R_{2H}$ | 919.966 |
| $K_m$ | −3.32353e + 01 | n | 1.51922 | $R_{1V}$ | 24.272 | $R_{2V}$ | ∞ |
| $D_m$ | −9.14563e − 08 | | | $K_1$ | 0.00000 | $K_2$ | 0.00000 |
| $E_m$ | 7.22560e − 11 | | | $D_1$ | 3.71320e − 08 | $D_2$ | −6.46412e − 07 |
| $F_m$ | −2.76691e − 14 | | | $E_1$ | −2.70826e − 12 | $E_2$ | 9.45474e − 11 |
| $G_m$ | 4.29321e − 18 | | | $F_1$ | −3.07221e − 16 | $F_2$ | −1.22253e − 14 |
| | | | | $G_1$ | 9.62415e − 20 | $G_2$ | 6.94307e − 19 |

EXAMPLE 4

| | | | | | | | |
|---|---|---|---|---|---|---|---|
| W | 220 | L | 36.0 | M | 55.0 | r | 17.32 |
| $x_m$ | 1.5 | $x_L$ | 3.00 | $\beta_p$ | 5.0 | $\beta_m$ | 3.0 |
| $f_m$ | 135.506 | | | | | | |
| $R_m$ | 239.737 | th | 10 | $R_{1H}$ | −370.703 | $R_{2H}$ | 1245.574 |
| $K_m$ | −2.72444e + 01 | n | 1.51922 | $R_{1V}$ | 23.526 | $R_{2V}$ | ∞ |
| $D_m$ | −1.05916e − 07 | | | $K_1$ | 0.00000 | $K_2$ | 0.00000 |
| $E_m$ | 8.57296e − 11 | | | $D_1$ | 4.43867e − 08 | $D_2$ | −4.75137e − 07 |
| $F_m$ | −3.76883e − 14 | | | $E_1$ | −5.56782e − 12 | $E_2$ | 5.72248e − 11 |
| $G_m$ | 7.50089e − 18 | | | $F_1$ | 5.29870e − 16 | $F_2$ | −6.55023e − 15 |
| | | | | $G_1$ | −1.45599e − 20 | $G_2$ | 3.30934e − 19 |

EXAMPLE 5

| | | | | | | | |
|---|---|---|---|---|---|---|---|
| W | 220 | L | 36.0 | M | 62.5 | r | 17.32 |
| $x_m$ | 1.5 | $x_L$ | 2.60 | $\beta_p$ | 5.0 | $\beta_m$ | 3.75 |
| $f_m$ | 135.400 | | | | | | |
| $R_m$ | 244.281 | th | 10 | $R_{1H}$ | −413.180 | $R_{2H}$ | 1209.886 |
| $K_m$ | −1.94544e + 01 | n | 1.51922 | $R_{1V}$ | 22.557 | $R_{2V}$ | ∞ |
| $D_m$ | −1.46423e − 07 | | | $K_1$ | 0.00000 | $K_2$ | 0.00000 |
| $E_m$ | 9.83633e − 11 | | | $D_1$ | 3.05549e − 08 | $D_2$ | −4.04940e − 07 |
| $F_m$ | −4.08015e − 14 | | | $E_1$ | −3.20937e − 12 | $E_2$ | 3.95771e − 11 |
| $G_m$ | 7.92061e − 18 | | | $F_1$ | 7.11185e − 16 | $F_2$ | −3.31930e − 15 |
| | | | | $G_1$ | −6.99536e − 20 | $G_2$ | 1.02164e − 19 |

EXAMPLE 6

| | | | | | | | |
|---|---|---|---|---|---|---|---|
| W | 220 | L | 36.0 | M | 75.0 | r | 17.32 |
| $x_m$ | 1.5 | $x_L$ | 2.00 | $\beta_p$ | 5.0 | $\beta_m$ | 5.25 |
| $f_m$ | 135.055 | | | | | | |
| $R_m$ | 248.615 | th | 10 | $R_{1H}$ | −491.670 | $R_{2H}$ | 813.007 |
| $K_m$ | −1.46706e + 01 | n | 1.51922 | $R_{1V}$ | 20.277 | $R_{2V}$ | ∞ |
| $D_m$ | −1.52865e − 07 | | | $K_1$ | 0.00000 | $K_2$ | 0.00000 |
| $E_m$ | 1.02675e − 10 | | | $D_1$ | 3.94670e − 08 | $D_2$ | −3.36010e − 07 |
| $F_m$ | −4.55279e − 14 | | | $E_1$ | −2.60797e − 12 | $E_2$ | 3.08420e − 11 |
| $G_m$ | 9.22406e − 18 | | | $F_1$ | −2.114404 − 16 | $F_2$ | −3.03034e − 15 |
| | | | | $G_1$ | 3.06827e − 20 | $G_2$ | 1.26506e − 19 |

EXAMPLE 7

| W | 220 | L | 36.0 | M | 90.0 | r | 17.32 |
|---|---|---|---|---|---|---|---|
| $x_m$ | 1.5 | $x_L$ | 1.50 | $\beta_P$ | 5.0 | $\beta_m$ | 6.25 |
| $f_m$ | 134.835 | | | | | | |
| $R_m$ | 251.998 | th | 10 | $R_{1H}$ | −709.362 | $R_{2H}$ | 392.109 |
| $K_m$ | −1.05614e + 01 | n | 1.51922 | $R_{1V}$ | 16.417 | $R_{2V}$ | ∞ |
| $D_m$ | −1.41582e − 07 | | | $K_1$ | 0.00000 | $K_2$ | 0.00000 |
| $E_m$ | 7.54551e − 11 | | | $D_1$ | 1.63683e − 08 | $D_2$ | −3.23877e − 07 |
| $F_m$ | −2.43957e − 14 | | | $E_1$ | 6.38129e − 12 | $E_2$ | 2.97499e − 11 |
| $G_m$ | 2.81184e − 18 | | | $F_1$ | −1.67552e − 15 | $F_2$ | −3.26806e − 15 |
| | | | | $G_1$ | 1.00364e − 19 | $G_2$ | 1.36524e − 19 |

EXAMPLE 8

| W | 220 | L | 36.0 | M | 100.0 | r | 17.32 |
|---|---|---|---|---|---|---|---|
| $x_m$ | 1.5 | $x_L$ | 0.00 | $\beta_P$ | 5.0 | $\beta_m$ | 6.0 |
| $f_m$ | 134.942 | | | | | | |
| $R_m$ | 255.010 | th | 10 | $R_{1H}$ | −1502.287 | $R_{2H}$ | 238.937 |
| $K_m$ | −7.80814e + 00 | n | 1.51922 | $R_{1V}$ | 13.026 | $R_{2V}$ | ∞ |
| $D_m$ | −1.36071e − 07 | | | $K_1$ | 0.00000 | $K_2$ | 0.00000 |
| $E_m$ | 6.46895e − 11 | | | $D_1$ | −3.56089e − 08 | $D_2$ | −3.53823e − 07 |
| $F_m$ | −1.85439e − 14 | | | $E_1$ | 1.48866e − 11 | $E_2$ | 3.29342e − 11 |
| $G_m$ | 1.07796e − 18 | | | $F_1$ | −2.18320e − 15 | $F_2$ | −3.80356e − 15 |
| | | | | $G_1$ | 9.55852e − 20 | $G_2$ | 1.43061e − 19 |

EXAMPLE 9

| W | 220 | L | 50.0 | M | 60.0 | r | 17.32 |
|---|---|---|---|---|---|---|---|
| $x_m$ | 1.5 | $x_L$ | 3.75 | $\beta_P$ | 5.0 | $\beta_m$ | 2.5 |
| $f_m$ | 135.735 | | | | | | |
| $R_m$ | 251.692 | th | 10 | $R_{1H}$ | −530.316 | $R_{2H}$ | 3696.546 |
| $K_m$ | 9.64148e − 01 | n | 1.51922 | $R_{1V}$ | 25.770 | $R_{2V}$ | ∞ |
| $D_m$ | −1.23714e − 07 | | | $K_1$ | 0.00000 | $K_2$ | 0.00000 |
| $E_m$ | 1.63463e − 11 | | | $D_1$ | 2.28444e − 08 | $D_2$ | −2.17034e − 07 |
| $F_m$ | −1.64810e − 15 | | | $E_1$ | −2.43966e − 12 | $E_2$ | 1.17745e − 11 |
| $G_m$ | 0.00000 | | | $F_1$ | 1.44160e − 16 | $F_2$ | −4.75011e − 16 |
| | | | | $G_1$ | 0.00000 | $G_2$ | 0.00000 |

EXAMPLE 10

| W | 220 | L | 50.0 | M | 100.0 | r | 17.32 |
|---|---|---|---|---|---|---|---|
| $x_m$ | 1.5 | $x_L$ | 2.00 | $\beta_P$ | 5.0 | $\beta_m$ | 4.5 |
| $f_m$ | 135.478 | | | | | | |
| $R_m$ | 260.082 | th | 10 | $R_{1H}$ | −1588.665 | $R_{2H}$ | 402.961 |
| $K_m$ | 7.00774e + 00 | n | 1.51922 | $R_{1V}$ | 14.644 | $R_{2V}$ | ∞ |
| $D_m$ | −1.24741e − 07 | | | $K_1$ | 0.00000 | $K_2$ | 0.00000 |
| $E_m$ | 7.18887e − 12 | | | $D_1$ | 5.64607e − 09 | $D_2$ | −1.72211e − 07 |
| $F_m$ | −1.56599e − 15 | | | $E_1$ | −1.59469e − 12 | $E_2$ | 9.13411e − 13 |
| $G_m$ | 0.00000 | | | $F_1$ | 4.67380e − 17 | $F_2$ | −4.68695e − 18 |
| | | | | $G_1$ | 0.00000 | $G_2$ | 0.00000 |

EXAMPLE 11

| | | | | | | | |
|---|---|---|---|---|---|---|---|
| W | 220 | L | 60.0 | M | 35.0 | r | 17.32 |
| $x_m$ | 1.5 | $x_L$ | 5.75 | $\beta_p$ | 5.0 | $\beta_m$ | 0.75 |
| $f_m$ | 135.833 | | | | | | |
| $R_m$ | 244.537 | th | 10 | $R_{1H}$ | −606.287 | $R_{2H}$ | 1667.512 |
| $K_m$ | 8.51804e − 01 | n | 1.51922 | $R_{1V}$ | 32.518 | $R_{2V}$ | ∞ |
| $D_m$ | −1.01091e − 07 | | | $K_1$ | 0.0000 | $K_2$ | 0.00000 |
| $E_m$ | 9.04368e − 12 | | | $D_1$ | −3.68083e − 08 | $D_2$ | −2.84790e − 07 |
| $F_m$ | −6.34970e − 16 | | | $E_1$ | 9.34622e − 12 | $E_2$ | 2.61246e − 11 |
| $G_m$ | 0.00000 | | | $F_1$ | 8.01597e − 16 | $F_2$ | −1.50801e − 15 |
| | | | | $G_1$ | 0.00000 | $G_2$ | 0.00000 |

EXAMPLE 12

| | | | | | | | |
|---|---|---|---|---|---|---|---|
| W | 220 | L | 70.0 | M | 35.0 | r | 17.32 |
| $x_m$ | 1.5 | $x_L$ | 7.00 | $\beta_p$ | 5.0 | $\beta_m$ | 1.5 |
| $f_m$ | 135.796 | | | | | | |
| $R_m$ | 253.930 | th | 10 | $R_{1H}$ | −747.578 | $R_{2H}$ | 38572.78 |
| $K_m$ | 4.04873e + 00 | n | 1.51922 | $R_{1V}$ | 35.811 | $R_{2V}$ | ∞ |
| $D_m$ | −7.74599e − 08 | | | $K_1$ | 0.0000 | $K_2$ | 0.00000 |
| $E_m$ | 1.94745e − 12 | | | $D_1$ | −3.80465e − 08 | $D_2$ | −1.62724e − 07 |
| $F_m$ | −3.03958e − 16 | | | $E_1$ | 8.97492e − 12 | $E_2$ | 1.55766e − 11 |
| $G_m$ | 0.00000 | | | $F_1$ | −6.72123e − 16 | $F_2$ | −8.41019e − 16 |
| | | | | $G_1$ | 0.00000 | $G_2$ | 0.00000 |

EXAMPLE 13

| | | | | | | | |
|---|---|---|---|---|---|---|---|
| W | 220 | L | 80.0 | M | 35.0 | r | 17.32 |
| $x_m$ | 1.5 | $x_L$ | 8.00 | $\beta_p$ | 5.0 | $\beta_m$ | 2.25 |
| $f_m$ | 135.731 | | | | | | |
| $R_m$ | 263.487 | th | 10 | $R_{1H}$ | −894.161 | $R_{2H}$ | −1754.17 |
| $K_m$ | 3.30594e + 00 | n | 1.51922 | $R_{1V}$ | 38.920 | $R_{2V}$ | ∞ |
| $D_m$ | −4.33704e − 08 | | | $K_1$ | 0.0000 | $K_2$ | 0.00000 |
| $E_m$ | 4.46328 − 13 | | | $D_1$ | −3.61652e − 08 | $D_2$ | −8.41032e − 08 |
| $F_m$ | −1.06606e − 16 | | | $E_1$ | −7.04205e − 12 | $E_2$ | 9.86436e − 12 |
| $G_m$ | 0.00000 | | | $F_1$ | −4.72947e − 16 | $F_2$ | −4.94179e − 16 |
| | | | | $G_1$ | 0.00000 | $G_2$ | 0.00000 |

EXAMPLE 14

| | | | | | | | |
|---|---|---|---|---|---|---|---|
| W | 220 | L | 80.0 | M | 25.0 | r | 17.32 |
| $x_m$ | 1.5 | $x_L$ | 9.00 | $\beta_p$ | 5.0 | $\beta_m$ | 2.25 |
| $f_m$ | 135.708 | | | | | | |
| $R_m$ | 262.705 | th | 10 | $R_{1H}$ | −856.991 | $R_{2H}$ | −1608.667 |
| $K_m$ | −3.15765e + 00 | n | 1.51922 | $R_{1V}$ | 41.394 | $R_{2V}$ | ∞ |
| $D_m$ | −4.60391e − 08 | | | $K_1$ | 0.0000 | $K_2$ | 0.00000 |
| $E_m$ | 7.88534e − 13 | | | $D_1$ | −3.50227e − 08 | $D_2$ | −9.48573e − 08 |
| $F_m$ | −1.06984e − 16 | | | $E_1$ | 5.92193e − 12 | $E_2$ | 9.82103e − 12 |
| $G_m$ | 0.00000 | | | $F_1$ | −4.14847e − 16 | $F_2$ | −4.57249e − 16 |
| | | | | $G_1$ | 0.00000 | $G_2$ | 0.00000 |

EXAMPLE 15

| | | | | | | | |
|---|---|---|---|---|---|---|---|
| W | 220 | L | 80.0 | M | 75.0 | r | 17.32 |
| $x_m$ | 1.5 | $x_L$ | 6.00 | $\beta_p$ | 5.0 | $\beta_m$ | 3.0 |
| $f_m$ | 135.724 | | | | | | |
| $R_m$ | 268.115 | th | 10 | $R_{1H}$ | −1257.495 | $R_{2H}$ | −2257.703 |
| $K_m$ | 2.38284e + 00 | n | 1.51922 | $R_{1V}$ | 27.353 | $R_{2V}$ | ∞ |
| $D_m$ | −2.99461e − 08 | | | $K_1$ | 0.0000 | $K_2$ | 0.00000 |
| $E_m$ | 1.38238e − 13 | | | $D_1$ | −3.35062e − 10 | $D_2$ | −3.10692e − 08 |
| $F_m$ | −4.11335e − 17 | | | $E_1$ | 1.66667e − 13 | $E_2$ | 1.47339e − 12 |
| $G_m$ | 0.00000 | | | $F_1$ | −7.07430e − 18 | $F_2$ | −1.80438e − 17 |
| | | | | $G_1$ | 0.00000 | $G_2$ | 0.00000 |

EXAMPLE 16

| | | | | | | | |
|---|---|---|---|---|---|---|---|
| W | 220 | L | 80.0 | M | 75.0 | r | 17.32 |
| $x_m$ | 1.5 | $x_L$ | 3.00 | $\beta_p$ | 2.5 | $\beta_m$ | 1.5 |
| $f_m$ | 135.530 | | | | | | |
| $R_m$ | 269.986 | th | 10 | $R_{1H}$ | −1358.679 | $R_{2H}$ | −2535.109 |
| $K_m$ | 2.14515e + 00 | n | 1.51922 | $R_{1V}$ | 26.200 | $R_{2V}$ | ∞ |
| $D_m$ | −2.79445e − 08 | | | $K_1$ | 0.0000 | $K_2$ | 0.00000 |
| $E_m$ | 1.59213e − 13 | | | $D_1$ | −4.01994e − 10 | $D_2$ | −2.93461e − 08 |
| $F_m$ | −3.33182e − 17 | | | $E_1$ | 3.17189e − 13 | $E_2$ | 1.55062e − 12 |
| $G_m$ | 0.00000 | | | $F_1$ | −1.55018e − 17 | $F_2$ | −2.28660e − 17 |
| | | | | $G_1$ | 0.00000 | $G_2$ | 0.00000 |

EXAMPLE 17

| | | | | | | | |
|---|---|---|---|---|---|---|---|
| W | 220 | L | 36.0 | M | 62.5 | r | 17.32 |
| $x_m$ | 1.5 | $x_L$ | 2.60 | $\beta_p$ | 5.0 | $\beta_m$ | 3.75 |
| $f_m$ | 131.6983 | | | | | | |
| $R_m$ | 242.079 | th | 10 | $R_{1H}$ | −420.617 | $R_{2H}$ | 3140.212 |
| $K_m$ | −1.76081e + 01 | n | 1.51922 | $R_{1V}$ | 22.098 | $R_{2V}$ | ∞ |
| $D_m$ | −1.43480e − 07 | | | $K_1$ | 0.0000 | $K_2$ | 0.00000 |
| $E_m$ | 9.50088e − 11 | | | $D_1$ | 3.25198e − 08 | $D_2$ | −3.85403e − 07 |
| $F_m$ | −4.03494e − 14 | | | $E_1$ | −4.67309e − 12 | $E_2$ | 3.56563e − 11 |
| $G_m$ | 7.92061e − 18 | | | $F_1$ | 8.83310e − 16 | $F_2$ | −3.09489e − 15 |
| | | | | $G_1$ | −6.99536e − 20 | $G_2$ | 1.02164e − 19 |

EXAMPLE 18

| | | | | | | | |
|---|---|---|---|---|---|---|---|
| W | 220 | L | 60.0 | M | 35.0 | r | 17.32 |
| $x_m$ | 1.5 | $x_L$ | 5.75 | $\beta_p$ | 5.0 | $\beta_m$ | 0.75 |
| $f_m$ | 132.127 | | | | | | |
| $R_m$ | 240.626 | th | 10 | $R_{1H}$ | −573.848 | $R_{2H}$ | 3365.851 |
| $K_m$ | 1.17583e + 00 | n | 1.51922 | $R_{1V}$ | 32.014 | $R_{2V}$ | ∞ |
| $D_m$ | −9.82525e − 08 | | | $K_1$ | 0.0000 | $K_2$ | 0.00000 |
| $E_m$ | 8.01295e − 12 | | | $D_1$ | 1.24037e − 09 | $D_2$ | −2.31664e − 07 |
| $F_m$ | −5.65937e − 16 | | | $E_1$ | −7.60029e − 13 | $E_2$ | 1.55087e − 11 |
| $G_m$ | 0.00000 | | | $F_1$ | 9.79549e − 17 | $F_2$ | −6.77801e − 16 |
| | | | | $G_1$ | 0.00000 | $G_2$ | 0.00000 |

EXAMPLE 19

| | | | | | | | |
|---|---|---|---|---|---|---|---|
| W | 220 | L | 80.0 | M | 75.0 | r | 17.32 |
| $x_m$ | 1.5 | $x_L$ | 6.00 | $\beta_p$ | 5.0 | $\beta_m$ | 3.0 |
| $f_m$ | 131.996 | | | | | | |
| $R_m$ | 263.704 | th | 10 | $R_{1H}$ | −1302.421 | $R_{2H}$ | −1213.420 |
| $K_m$ | 2.25434e + 00 | n | 1.51922 | $R_{1V}$ | 26.466 | $R_{2V}$ | ∞ |
| $D_m$ | −2.86539e − 08 | | | $K_1$ | 0.0000 | $K_2$ | 0.00000 |
| $E_m$ | 6.15671e − 14 | | | $D_1$ | −7.59746e − 09 | $D_2$ | −3.33379e − 08 |
| $F_m$ | −3.66942e − 17 | | | $E_1$ | 1.36110e − 12 | $E_2$ | 2.61977e − 12 |
| $G_m$ | 0.00000 | | | $F_1$ | −6.94622e − 17 | $F_2$ | −7.43665e − 17 |
| | | | | $G_1$ | 0.00000 | $G_2$ | 0.00000 |

EXAMPLE 20

| | | | | | | | |
|---|---|---|---|---|---|---|---|
| W | 220 | L | 36.0 | M | 62.5 | r | 17.32 |
| $x_m$ | 1.5 | $x_L$ | 2.60 | $\beta_p$ | 5.0 | $\beta_m$ | 3.75 |
| $f_m$ | 120.167 | | | | | | |
| $R_m$ | 232.407 | th | 10 | $R_{1H}$ | −450.127 | $R_{2H}$ | −851.987 |
| $K_m$ | −9.34985e + 00 | n | 1.51922 | $R_{1V}$ | 20.441 | $R_{2V}$ | ∞ |
| $D_m$ | −1.80751e − 07 | | | $K_1$ | 0.0000 | $K_2$ | 0.00000 |
| $E_m$ | 1.03536e − 10 | | | $D_1$ | 3.13383e − 08 | $D_2$ | −3.63835e − 07 |
| $F_m$ | −4.37516e − 14 | | | $E_1$ | −6.82411e − 12 | $E_2$ | 3.08486e − 11 |
| $G_m$ | 7.92061e − 18 | | | $F_1$ | 1.15113e − 15 | $F_2$ | −2.97136e − 15 |
| | | | | $G_1$ | −6.99536e − 20 | $G_2$ | 1.02164e − 19 |

EXAMPLE 21

| | | | | | | | |
|---|---|---|---|---|---|---|---|
| W | 220 | L | 60.0 | M | 35.0 | r | 17.32 |
| $x_m$ | 1.5 | $x_L$ | 5.75 | $\beta_p$ | 5.0 | $\beta_m$ | 0.75 |
| $f_m$ | 120.639 | | | | | | |
| $R_m$ | 229.793 | th | 10 | $R_{1H}$ | −581.002 | $R_{2H}$ | −1609.465 |
| $K_m$ | 2.25008e + 00 | n | 1.51922 | $R_{1V}$ | 30.395 | $R_{2V}$ | ∞ |
| $D_m$ | −8.94697e − 08 | | | $K_1$ | 0.00000 | $K_2$ | 0.00000 |
| $E_m$ | 3.86453e − 12 | | | $D_1$ | −7.06742e − 09 | $D_2$ | −1.75970e − 07 |
| $F_m$ | −2.88035e − 16 | | | $E_1$ | 2.47273e − 12 | $E_2$ | 1.12020e − 11 |
| $G_m$ | 0.00000 | | | $F_1$ | −2.00818e − 16 | $F_2$ | −4.42406e − 16 |
| | | | | $G_1$ | 0.00000 | $G_2$ | 0.00000 |

EXAMPLE 22

| | | | | | | | |
|---|---|---|---|---|---|---|---|
| W | 220 | L | 80.0 | M | 75.0 | r | 17.32 |
| $x_m$ | 1.5 | $x_L$ | 6.00 | $\beta_p$ | 5.0 | $\beta_m$ | 3.0 |
| $f_m$ | 120.491 | | | | | | |
| $R_m$ | 248.140 | th | 10 | $R_{1H}$ | −1316.457 | $R_{2H}$ | −450.985 |
| $K_m$ | 1.74984e + 00 | n | 1.51922 | $R_{1V}$ | 23.482 | $R_{2V}$ | ∞ |
| $D_m$ | −2.58401e − 08 | | | $K_1$ | 0.00000 | $K_2$ | 0.00000 |
| $E_m$ | 6.60495e − 14 | | | $D_1$ | −1.86170e − 08 | $D_2$ | −2.95194e − 08 |
| $F_m$ | −3.13230e − 17 | | | $E_1$ | 2.86204e − 12 | $E_2$ | 4.58838e − 12 |
| $G_m$ | 0.00000 | | | $F_1$ | −1.31398e − 16 | $F_2$ | −1.41288e − 16 |
| | | | | $G_1$ | 0.00000 | $G_2$ | 0.00000 |

Hereinbelow, the conditions satisfied by the scanning optics of Examples 1 to 22 according to the present invention will be described, together with the effects obtained when the conditions are satisfied.

In Examples 1 to 22, a light flux from a light source is incident to a reflection surface of an optical deflector via a first image formation optical system. The light flux is scanned by the rotating optical deflector, and converged on a surface to be scanned via a second image formation optical system to form an image on the surface to be scanned. The curvature of field and the fθ characteristics are effectively corrected by the second image formation optical system composed of a curved mirror and a correction lens where the refractive power in the sub-scanning direction at the center thereof in the scanning direction is different from that at the periphery thereof. Thus, a small-size, inexpensive optical scanner with high resolution can be realized.

In Examples 1 to 22, the incident surface of the correction lens is a saddle toroidal surface where a circular arc or a curve having fourth or higher order development terms which is present in a plane parallel to the scanning direction and including the optical axis is rotated around a rotational symmetric axis which is parallel to the scanning direction and is present in the plane including the optical axis. Thus, the refractive power in the sub-scanning direction at the center of the correction lens in the scanning direction can be made different from that at the periphery thereof at low cost.

In Examples 1 to 22, the emergent surface of the correction lens is a cylindrical surface having a refracting force only in the scanning direction; an aspherical cylindrical surface having a refracting force only in the scanning direction where the section in the scanning direction has fourth or higher order development terms; or a barrel toroidal surface where a curve having fourth or higher order development terms, which is parallel to the scanning direction, and present in a place including the optical axis is rotated around a rotational symmetric axis which is parallel to the scanning direction and present in the place including the optical axis. Thus, the fθ characteristics can be effectively corrected.

In Examples 1 to 22, when the focal length of the second image formation optical system in the scanning direction is $f_m$ (mm), the effective scanning width of the surface to be scanned is W (mm), the distance between the deflection point of the optical deflector and the reflection point of the curved mirror is L (mm), and the distance between the effective outermost position of the curved mirror in the scanning direction and the tangent plane of the vertex of the mirror surface is zm (mm), conditional formula (1) below is satisfied:

$$0.159 \left( \frac{L}{f_m} + C_1 \right)^2 + \tag{1}$$

$$C_2 - 0.267 < \frac{2m}{f_m} < 0.159 \left( \frac{L}{f_m} + C_1 \right)^2 + C_2 - 0.257$$

$$C_1 = 0.388 \left( \frac{W}{f_m} \right)^2 - 0.416 \frac{W}{f_m} - 0.217$$

$$C_2 = -0.153 \left( \frac{W}{f_m} \right)^2 + 0.404 \frac{W}{f_m}$$

Thus, the curvature of field and the fθ characteristics are effectively corrected.

In Examples 1 to 22, the curved mirror is an axial-symmetric aspherical surface, so as to realize the precision processing easily.

In Examples 1 to 22, when the displacement of the vertex of the curved mirror from the optical axis in the sub-scanning direction is $x_m$ (mm), conditional formula (2) below is satisfied. If the value exceeds the upper limit of formula (2), the corrections of the curvature of field and the fθ characteristics are difficult. If the value is less than the lower limit of formula (2), the center of the curved mirror where an error in the shape tends to occur at the processing of the mirror is within an effective practical range. This requires a fabrication process with higher precision, resulting in an increase in cost.

$$0.5 < x_m < 5.0 \tag{2}$$

In Examples 1 to 22, when the distance between the reflection point of the curved mirror and the incident surface of the correction lens is M (mm), conditional formula (3) below is satisfied. If the value exceeds the upper limit of formula (3), the variation in the thickness of the correction lens becomes large, making it difficult to process the correction lens. If the value is less than the lower limit thereof, the corrections of the curvature of field and the fθ characteristics become difficult.

$$0.43 \left( 1 - \frac{L}{f_m} \right) < \frac{M}{f_m} < 0.75 \tag{3}$$

In Examples 1 to 22, when the angle formed by the plane vertical to the reflection surface of the optical deflector and parallel to the scanning direction and the optical axis of the first image formation optical system is $\beta_p$ (deg.), and the displacement of the center of the incident surface of the correction lens from the optical axis in the sub-scanning direction is $x_L$ (mm), conditional formula (4) below is satisfied. If formula (4) is not satisfied, an aberration is generated in a light ray in an oblique direction across the pupil of the lens.

$$0.11 \frac{L}{f_m} - 0.043 \frac{M}{f_m} + \tag{4}$$

$$0.0007 < \frac{5 \cdot x_L}{f_m \cdot \beta_p} < 0.11 \frac{L}{f_m} - 0.043 \frac{M}{f_m} + 0.0155$$

In Examples 1 to 22, when the angle formed by the normal to the vertex of the curved mirror and the optical axis is $\beta_m$ (deg.), conditional formula (5) below is satisfied. If formula (5) is not satisfied, the scanning lines on the surface to be scanned curve in the subscanning direction.

$$\frac{0.31}{\frac{L}{f_m} - 0.162} - \frac{\left( \frac{M}{f_m} - 0.738 \right)^2}{0.42 \left( \frac{L}{f_m} \right)^2 + 0.00272} + \tag{5}$$

$$1.5 < \beta_m \cdot \frac{5}{\beta_p} < \frac{0.31}{\frac{L}{f_m} - 0.162} - \frac{\left( \frac{M}{f_m} - 0.738 \right)^2}{0.42 \left( \frac{L}{f_m} \right)^2 + 0.00272} + 4.5$$

In Examples 1 to 22, if the value exceeds the upper limit of conditional formula (6) below, the corrections of the curvature of field and the fθ characteristics become difficult if the value is less than the lower limit thereof, it is difficult to reduce the size of the scanning optics.

$$1.30 < \frac{W}{f_m} < 2.13 \tag{6}$$

Figure 3:
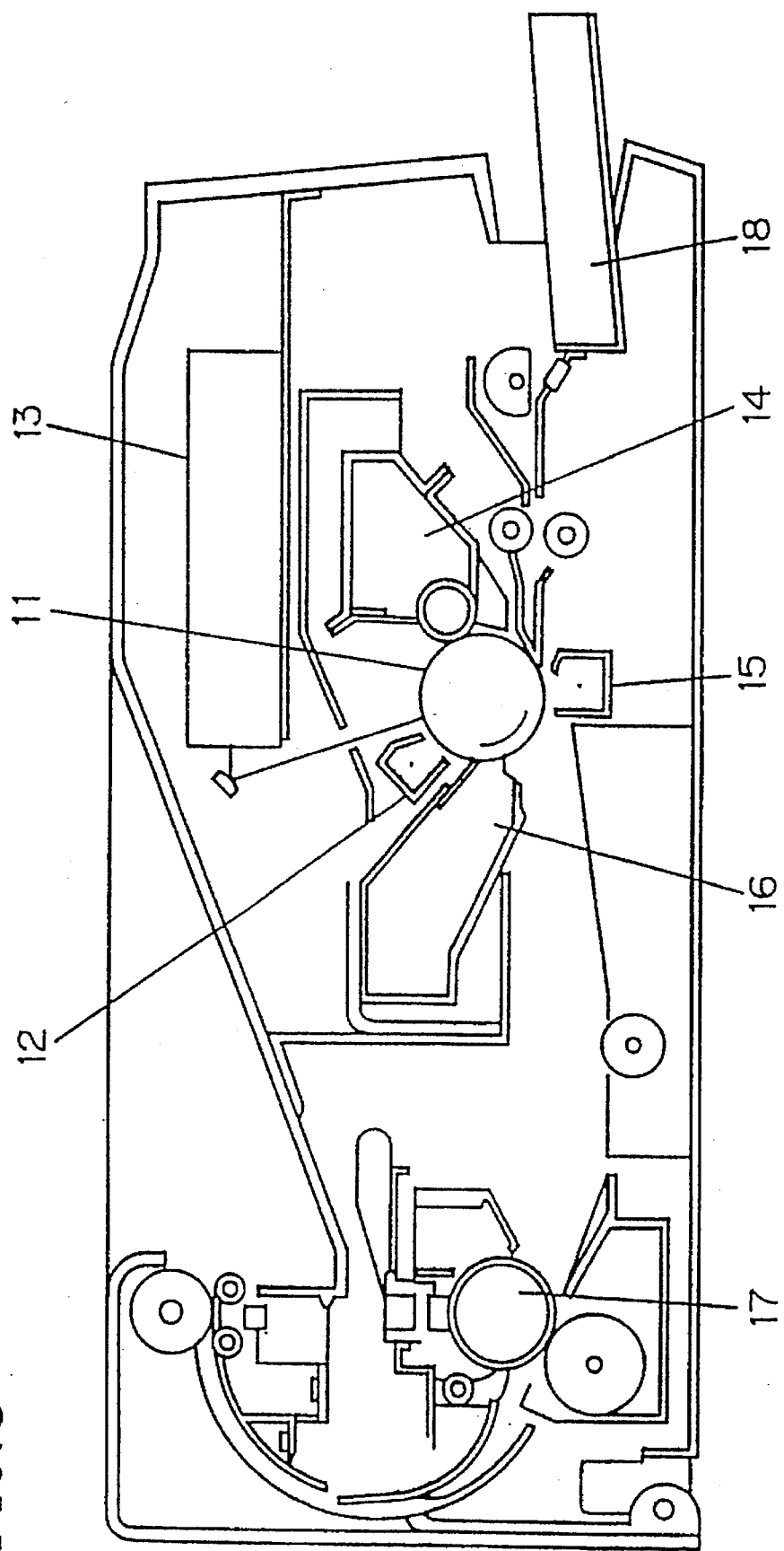
FIG. 3 shows a configuration of an image formation apparatus according to the present invention.

FIG. 3 shows the configuration of an image formation apparatus using the scanning optics of the present invention. Referring to FIG. 3, the image formation apparatus includes a photosensitive drum 11 covered with a photosensitive body whose electric charges change when irradiated with light, a primary electrifier 12 for attaching electrostatic ions to the surface of the photosensitive body to electrify the photosensitive body, an optical scanner 13 of the present invention for writing printing information on the photosensitive drum 11, a developer 14 for attaching electrified toner to printing portions, a transfer electrifier 15 for transferring the attached toner to a sheet, a cleaner 16 for removing remaining toner, a fixing device 17 for fixing the transferred toner to the sheet, and a feed cassette 18.

Figure 4:
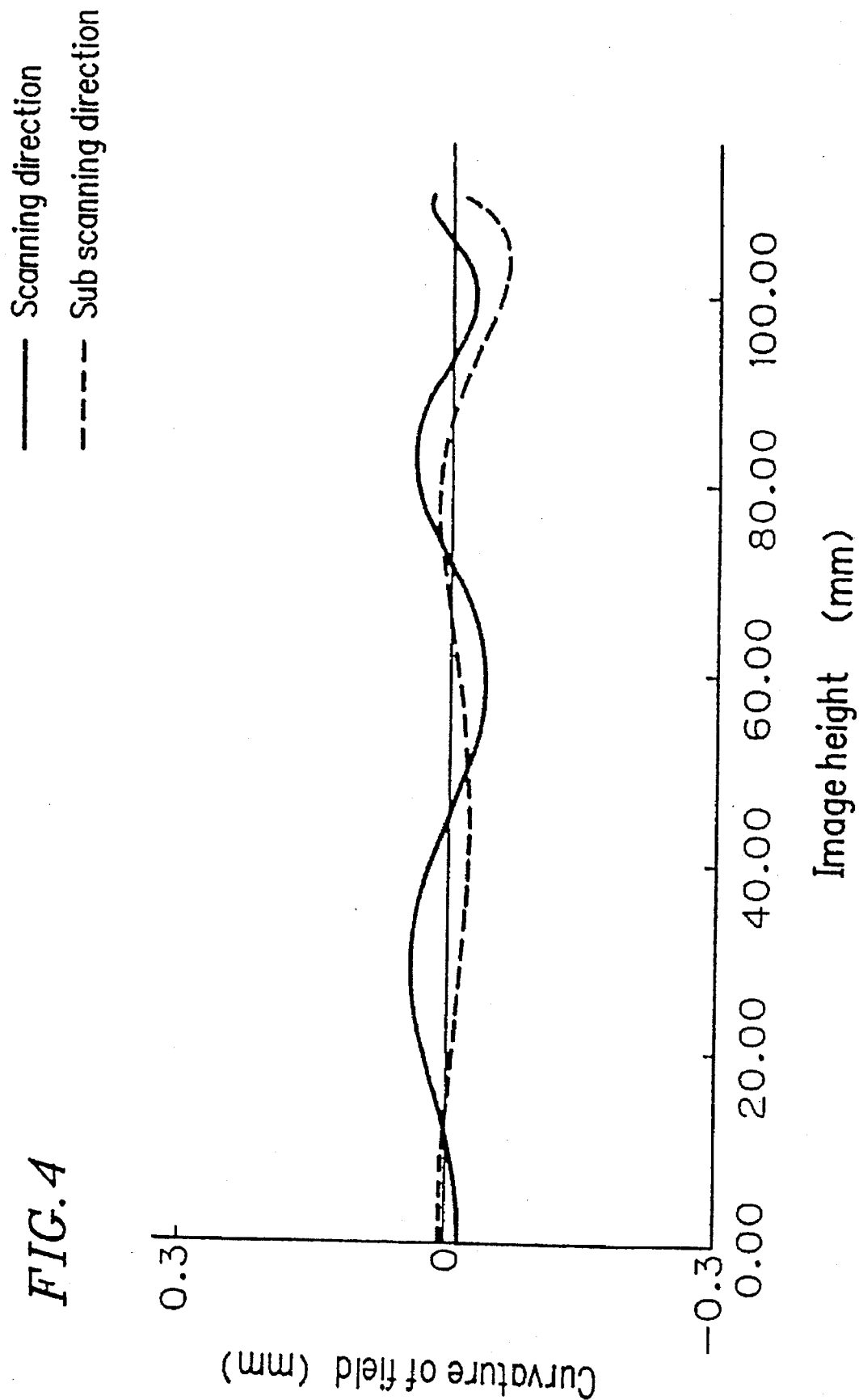
FIG. 4 shows the curvature of field of a scanning optics according to the present invention.
Figure 5:
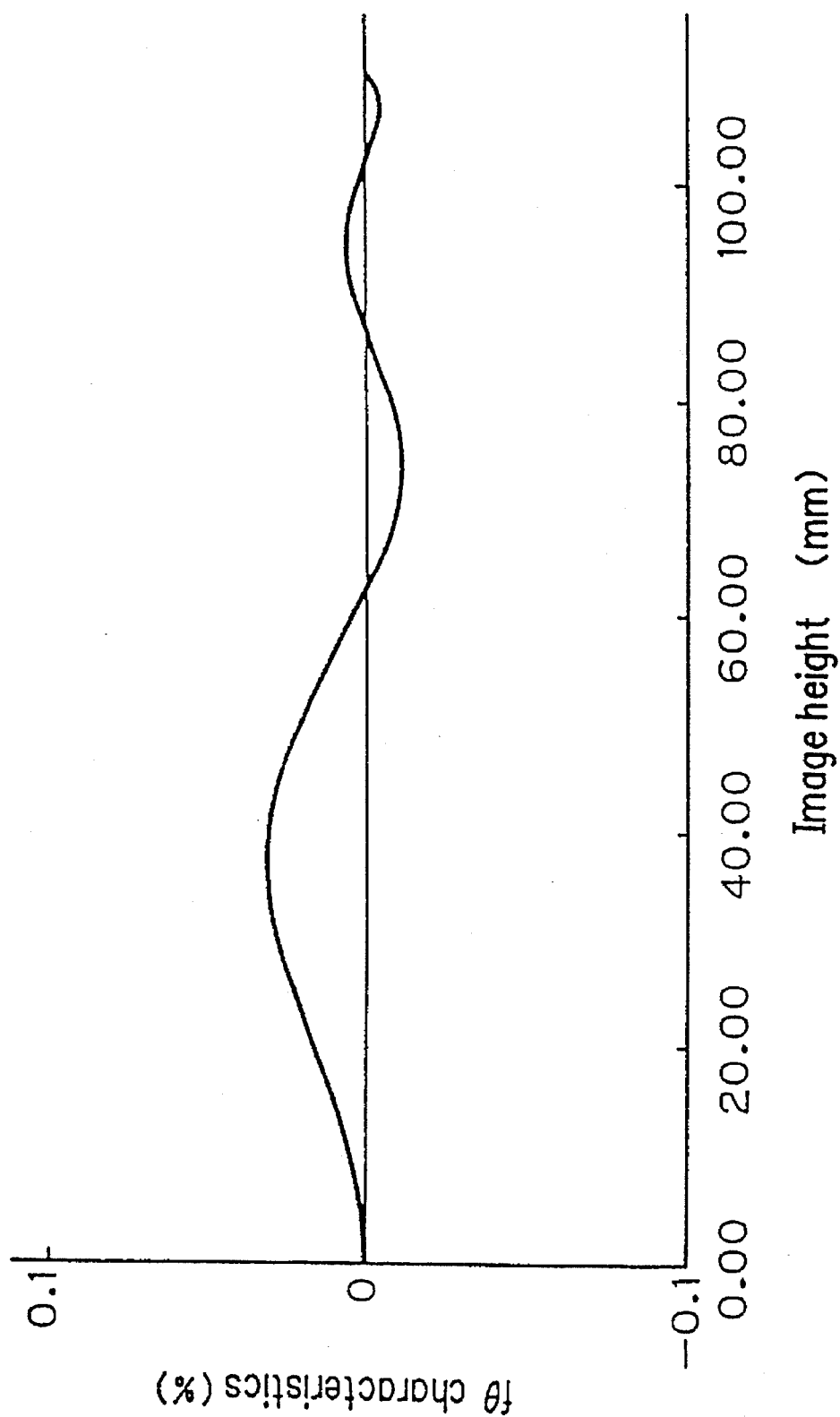
FIG. 5 shows the fθ characteristics of a scanning optics according to the present invention.

FIGS. 4 and 5 show the remaining curvature of field and the fθ characteristics, respectively, obtained in the scanning optics of Example 5 according to the present invention.

As described above, a small-size, inexpensive image formation apparatus can be realized by using the scanning optics of the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical scanner comprising a light source, an optical deflector for scanning a light flux from the light source a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein an incident surface of the correction lens is a saddle toroidal surface having a profile defined by a circular arc which is present in a plane parallel to the scanning direction and including an optical axis, and is rotated around a rotational symmetric axis which is parallel to the scanning direction and present in the plane including the optical axis.

2. An optical scanner according to claim 1, wherein the curved mirror has an axial-symmetric aspherical surface.

3. An optical scanner according to claim 1, wherein, when a displacement of a vertex of the curved mirror from an optical axis is $x_m$ (mm), conditional formula (2) below is satisfied:

$$0.5 < x_m < 5.0 \quad (2)$$

4. An optical scanner according to claim 1, wherein, when a distance between a reflection point of the optical deflector and a reflection point of the curved mirror is L (mm), a distance between the reflection point of the curved mirror and an incident surface of the-correction lens is M (mm), and the focal length of the second image formation optical system in the scanning direction is $f_m$ (mm), conditional formula (3) below is satisfied:

$$0.43\left(1 - \frac{L}{f_m}\right) < \frac{M}{f_m} < 0.75 \quad (3)$$

5. An optical scanner according to claim 1, wherein a focal length of the second image formation optical system in the scanning direction is $f_m$ (mm), and an effective scanning width of the surface to be scanned is W (mm), conditional formula (6) below is satisfied:

$$1.30 < \frac{W}{f_m} < 2.13 \quad (6)$$

6. An optical scanner according to claim 1, wherein an emergent surface of the correction lens is a cylindrical surface having a refractive power only in the scanning direction.

7. An optical scanner according to claim 6, wherein an emergent surface of the correction lens is a aspherical cylindrical surface which has a refractive power only in the scanning direction and the section of the surface in the scanning direction has fourth or higher order development terms.

8. An optical scanner according to claim 7, wherein, when a focal length of the second image formation optical system in the scanning direction is $f_m$ (mm), an effective scanning width of the surface to be scanned is W (mm), a distance between a deflection point of the optical deflector and a reflection point of the curved mirror is L (mm), and a distance between an effective outermost position of the curved mirror in the scanning direction and a tangent plane of a vertex of the mirror surface is zm (mm), conditional formula (1) below is satisfied:

$$0.159\left(\frac{L}{f_m} + C_1\right)^2 + \quad (1)$$

$$C_2 - 0.267 < \frac{2m}{f_m} < 0.159\left(\frac{L}{f_m} + C_1\right)^2 + C_2 - 0.257$$

wherein $$C_1 = 0.388\left(\frac{W}{f_m}\right)^2 - 0.416\frac{W}{f_m} - 0.217$$

$$C_2 = -0.153\left(\frac{W}{f_m}\right)^2 + 0.404\frac{W}{f_m}.$$

9. An optical scanner according to claim 8, wherein, when a displacement of a vertex of the curved mirror from an optical axis is $x_m$ (mm), conditional formula (2) below is satisfied:

$$0.5 < x_m < 5.0 \quad (2)$$

10. An optical scanner according to claim 9, wherein, when a distance between a reflection point of the optical deflector and a reflection point of the curved mirror is L (mm), a distance between the reflection point of the curved mirror and an incident surface of the correction lens is M (mm), and the focal length of the second image formation optical system in the scanning direction is $f_m$ (mm), conditional formula (3) below is satisfied:

$$0.43\left(1 - \frac{L}{f_m}\right) < \frac{M}{f_m} < 0.75. \quad (3)$$

11. An optical scanner according to claim 10, wherein an angle formed by a plane vertical to a reflection surface the optical deflector and parallel to the scanning direction and an optical axis of the first image formation optical system is $\beta_p$ (deg.), a distance between a reflection point of the optical deflector and a reflection point of the curved mirror is L (mm), a distance between the reflection point of the curved mirror and the incident surface of the correction lens is M (mm), a focal length of the second image formation optical system in the scanning direction is $f_m$ (mm), and a displacement of a center of the incident surface of the correction lens from the optical axis in the sub-scanning direction is $x_L$ (mm), conditional formula (4) below is satisfied:

$$0.11\frac{L}{f_m} - 0.043\frac{M}{f_m} + 0.0007 < \frac{5 \cdot x_L}{f_m \cdot \beta_P} < 0.11\frac{L}{f_m} - \quad (4)$$

$$0.043\frac{M}{f_m} + 0.0155.$$

12. An optical scanner according to claim 11, wherein an angle formed by a plane vertical to a reflection surface of the optical deflector and parallel to the scanning direction and an optical axis of the first image formation optical system is $\beta_p$ (deg.), a distance between a reflection point of the optical deflector and a reflection point of the curved mirror is L (mm), a distance between the reflection point of the curved mirror and an incident surface of the correction lens is M (mm), a focal length of the second image formation optical system in the scanning direction is $f_m$ (mm), and an angle formed by a normal to a vertex of the curved mirror and the optical axis is $\beta_m$ (deg.), conditional formula (5) below is satisfied:

$$\frac{0.31}{\frac{L}{f_m} - 0.162} - \frac{\left(\frac{M}{f_m} - 0.738\right)^2}{0.42\left(\frac{L}{f_m}\right)^2 + 0.00272} + 1.5 < \beta_m. \tag{5}$$

$$\frac{5}{\beta_p} < \frac{0.31}{\frac{L}{f_m} - 0.162} - \frac{\left(\frac{M}{f_m} - 0.738\right)^2}{0.42\left(\frac{L}{f_m}\right)^2 + 0.00272} + 4.5.$$

13. An optical scanner according to claim 12, wherein a focal length of the second image formation optical system in the scanning direction is $f_m$ (mm), and an effective scanning width of the surface to be scanned is W (mm), conditional formula (6) below is satisfied:

$$1.30 < \frac{W}{f_m} < 2.13. \tag{6}$$

14. An image formation apparatus using the optical scanner according to claim 1.

15. An optical scanner comprising a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein an incident surface of the correction lens is a saddle toroidal surface having a profile defined by a curve having fourth or higher order development terms which is present in a plane parallel to the scanning direction and including an optical axis, and is rotated around a rotational symmetric axis which is parallel to the scanning direction and is present in the plane including the optical axis.

16. An optical scanner comprising a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein an emergent surface of the correction lens is a cylindrical surface having a refractive power only in the scanning direction.

17. An optical scanner comprising a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein an emergent surface of the correction lens is an aspherical cylindrical surface which has a refractive power only in the scanning direction and the section of the surface in the scanning direction has fourth or higher order development terms.

18. An optical scanner comprising a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein an emergent surface of the correction lens is a barrel toroidal surface having a profile defined by a curve having fourth or higher order development terms which is present in a plane parallel to the scanning direction and including an optical axis, and is rotated around a rotational symmetric axis which is parallel to the scanning direction and is present in the plane including the optical axis.

19. An optical scanner comprising a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein, when a focal length of the second image formation optical system in the scanning direction is $f_m$ (mm), an effective scanning width of the surface to be scanned is W (mm), a distance between a deflection point of the optical deflector and a reflection point of the curved mirror is L (mm), and a distance between an effective outermost position of the curved mirror in the scanning direction and a tangent plane of a vertex of the mirror surface is zm (mm), conditional formula (1) below is satisfied:

$$0.159\left(\frac{L}{f_m}+C_1\right)^2+C_2- \quad (1)$$

$$0.267 < \frac{zm}{f_m} < 0.159\left(\frac{L}{f_m}+C_1\right)^2+C_2-0.257$$

wherein $$C_1 = 0.388\left(\frac{W}{f_m}\right)^2 - 0.416\frac{W}{f_m} - 0.217$$

$$C_2 = 0.153\left(\frac{W}{f_m}\right)^2 + 0.404\frac{W}{f_m}.$$

20. An optical scanner comprising a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein an angle formed by a plane vertical to a reflection surface of the optical deflector and parallel to the scanning direction and an optical axis of the first image formation optical system is $\beta_p$ (deg.), a distance between a reflection point of the optical deflector and a reflection point of the curved mirror is L (mm), a distance between the reflection point of the curved mirror and the incident surface of the correction lens is M (mm), a focal length of the second image formation optical system in the scanning direction is $f_m$ (mm), and a displacement of a center of the incident surface of the correction lens from the optical axis in the subscanning direction is $x_L$ (mm), conditional formula (4) below is satisfied:

$$0.11\frac{L}{f_m} - 0.043\frac{M}{f_m} + 0.0007 < \frac{5 \cdot x_L}{f_m \cdot \beta_p} < 0.11\frac{L}{f_m} - \quad (4)$$

$$0.043\frac{M}{f_m} + 0.0155.$$

21. An optical scanner comprising a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein an angle formed by a plane vertical to a reflection surface of the optical deflector and parallel to the scanning direction and an optical axis of the first image formation optical system is $\beta_p$ (deg.), a distance between a reflection point of the optical deflector and a reflection point of the curved mirror is L (mm), a distance between the reflection point of the curved mirror and an incident surface of the correction lens is M (mm), a focal length of the second image formation optical system in the scanning direction is $f_m$ (mm), and an angle formed by a normal to a vertex of the curved mirror and the optical axis is $\beta_p$ (deg.), conditional formula (5) below is satisfied:

$$\frac{0.31}{\frac{L}{f_m}-0.162} - \frac{\left(\frac{M}{f_m}-0.738\right)^2}{0.42\left(\frac{L}{f_m}\right)^2+0.00272}+1.5 < \beta_m. \quad (5)$$

$$\frac{5}{\beta_p} < \frac{0.31}{\frac{L}{f_m}-0.162} - \frac{\left(\frac{M}{f_m}-0.738\right)^2}{0.42\left(\frac{L}{f_m}\right)^2+0.00272}+4.5.$$

22. An optical scanner comprising a light source, an optical deflector for scanning a light flux from the light source, a first image formation optical system disposed between the light source and the optical deflector, and a second image formation optical system disposed between the optical deflector and a surface to be scanned, wherein the second image formation optical system includes a curved mirror for reflecting a light flux from the optical deflector and a correction lens for converging the light flux from the curved mirror on the surface to be scanned, a refractive power in a sub-scanning direction at a center of the correction lens in a scanning direction being different from a refractive power in a sub-scanning direction at a periphery of the correction lens, wherein an incident surface of the correction lens is a saddle toroidal surface having a profile defined by a curve having fourth or higher order development terms which is present in a plane parallel to the scanning direction and including an optical axis, and is rotated around a rotational symmetric axis which is parallel to the scanning direction and is present in the plane including the optical axis.

23. An optical scanner according to claim 22, wherein the curved mirror has an axial-symmetric aspherical surface.

24. An optical scanner according to claim 22, wherein, when a displacement of a vertex of the curved mirror from an optical axis is $x_m$ (mm), conditional formula (2) below is satisfied:

$$0.5 < x_m < 5.0 \quad (2)$$

25. An optical scanner according to claim 22, wherein, when a distance between a reflection point of the optical deflector and a reflection point of the curved mirror is L (mm), a distance between the reflection point of the curved mirror and an incident surface of the correction lens is M (mm), and the focal length of the second image formation optical system in the scanning direction is $f_m$ (mm), conditional formula (3) below is satisfied:

$$0.43\left(1-\frac{L}{f_m}\right) < \frac{M}{f_m} < 0.75. \quad (3)$$

26. An optical scanner according to claim 22, wherein a focal length of the second image formation optical system in the scanning direction is $f_m$ (mm), and an effective scanning width of the surface to be scanned is W (mm), conditional formula (6) below is satisfied:

$$1.30 < \frac{W}{f_m} < 2.13. \quad (6)$$

27. An image formation apparatus using the optical scanner according to claim 22.

* * * * *

UNITED STATES PATENT AND TRADEMARK OFFICE
CERTIFICATE OF CORRECTION

PATENT NO.   : 5,657,147

DATED        : August 12, 1997

INVENTOR(S)  : Motonobu Yoshikawa et al.

It is certified that error appears in the above-identified patent and that said Letters Patent is hereby corrected as shown below:

In the Specification:

Column 19, formula (1), change "$2m/f_m$" to --$zm/f_m$--.

In the Claims:

Claim 8, formula (1), change "$2m/f_m$" to --$zm/f_m$--.

Claim 11, line 2, insert --of-- between "surface" and "the".

Signed and Sealed this

Twenty-seventh Day of January, 1998

BRUCE LEHMAN

Attest:

Attesting Officer

Commissioner of Patents and Trademarks